US011966546B2

(12) United States Patent
Lin et al.

(10) Patent No.: US 11,966,546 B2
(45) Date of Patent: Apr. 23, 2024

(54) DISPLAY DEVICE, FABRICATION METHOD OF DISPLAY DEVICE, AND FABRICATION METHOD OF LIGHT GUIDE TOUCH MODULE

(71) Applicant: E Ink Holdings Inc., Hsinchu (TW)

(72) Inventors: Chen-Cheng Lin, Hsinchu (TW); Chia-I Liu, Hsinchu (TW); Kun-Hsien Lee, Hsinchu (TW); Hung-Wei Tseng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/445,403

(22) Filed: Aug. 19, 2021

(65) Prior Publication Data

US 2022/0129093 A1    Apr. 28, 2022

(30) Foreign Application Priority Data

Oct. 22, 2020   (TW) ................................. 109136583

(51) Int. Cl.
*G06F 3/044*   (2006.01)
*G02F 1/1677*  (2019.01)

(52) U.S. Cl.
CPC ............ *G06F 3/044* (2013.01); *G02F 1/1677* (2019.01)

(58) Field of Classification Search
None
See application file for complete search history.

(56) References Cited

U.S. PATENT DOCUMENTS 9,087,488 B1 *  7/2015  Zehner .................... G02F 1/167
9,626,024 B1 *  4/2017  Tan ........................ H05K 13/00
10,310,650 B2   6/2019  Heo et al.
10,347,700 B2   7/2019  Yang et al.
10,409,411 B2   9/2019  Heo et al.
2010/0265206 A1  10/2010  Chen
2014/0126040 A1 *  5/2014  Huang .................... G02F 1/167
                                                    359/296
2014/0146563 A1 *  5/2014  Watanabe ............ G02B 6/0043
                                                    362/606
2014/0204291 A1 *  7/2014  Kung ...................... G06F 3/041
                                                    349/12
2014/0320458 A1 * 10/2014  Wu ........................ G06F 3/042
                                                    345/175

(Continued)

FOREIGN PATENT DOCUMENTS

CN    105320328 A    2/2016
CN    105892122 A    8/2016

(Continued)

OTHER PUBLICATIONS

Corresponding Taiwan office action dated Jun. 29, 2021.

(Continued)

*Primary Examiner* — Christopher R Lamb
(74) *Attorney, Agent, or Firm* — CKC & Partners Co., LLC

(57) ABSTRACT

A display device includes a base layer, a touch sensing layer, a light guide module and a display panel. The touch sensing layer is disposed on the base layer. The light guide module is disposed on the touch sensing layer. The touch sensing layer is located between the light guide module and the display panel, and the touch sensing layer and one of the light guide module and the display panel have no adhesive material therebetween.

16 Claims, 15 Drawing Sheets

(56) References Cited

U.S. PATENT DOCUMENTS

| | | | |
|---|---|---|---|
| 2015/0109546 A1 | 4/2015 | Tai et al. | |
| 2015/0253487 A1* | 9/2015 | Nichol | G02B 6/0018 |
| | | | 362/610 |
| 2016/0070397 A1* | 3/2016 | Su | G06F 3/0412 |
| | | | 345/173 |
| 2016/0246419 A1 | 8/2016 | Jiang et al. | |
| 2017/0262088 A1* | 9/2017 | Wang | G02B 6/0055 |
| 2017/0276989 A1 | 9/2017 | Lin et al. | |
| 2017/0300142 A1 | 10/2017 | Zeng | |
| 2018/0287092 A1* | 10/2018 | Song | H01L 51/0097 |

FOREIGN PATENT DOCUMENTS

| | | |
|---|---|---|
| CN | 106445215 A | 2/2017 |
| CN | 110930876 A | 3/2020 |
| CN | 111754856 A | 10/2020 |
| TW | I522857 B | 2/2016 |
| TW | I606374 B | 11/2017 |

OTHER PUBLICATIONS

The office action of corresponding CN application No. 202011137714.9 dated May 31, 2023.
The office action of corresponding CN application No. 202011137714.9 issued on Feb. 2, 2024.

* cited by examiner

DISPLAY DEVICE, FABRICATION METHOD OF DISPLAY DEVICE, AND FABRICATION METHOD OF LIGHT GUIDE TOUCH MODULE

CROSS-REFERENCE TO RELATED APPLICATION

This application claims priority to Taiwan Application Serial Number 109136583, filed Oct. 22, 2020, which is herein incorporated by reference in its entirety.

BACKGROUND

Field of Invention

The present disclosure relates to a display device, and in particular to a display device with a cover structure.

Description of Related Art

Nowadays, wearable devices and smart products are all developing in the direction of large size and bendability. Therefore, both a touch sensing layer and a light guide layer need to be light, thin, flexible and bendable. In addition, fabrication approaches of the touch sensing layer and the light guide layer also aim at integration.

In a conventional touch sensing layer, a transparent conductive film (such as indium tin oxide, ITO) is used as an electrode material, and is formed on a glass substrate or a polyethylene terephthalate (PET) film. The transparent conductive film needs to go through sputtering, yellow light, printing, and laser processes, and then undergo an attaching process to complete the preparation of upper and lower electrodes. Therefore, a fabrication process of the touch sensing layer is cumbersome and cannot meet the development trend of lightness and thinness. In addition, material properties of indium tin oxide are brittle and not easy to bend, and it is thus relatively difficult to apply it to flexible and large-sized products.

A conventional light guide plate uses polymethyl methacrylate (PMMA) and polycarbonate (PC) as main materials. The light guide layer is generally attached to a cover plate or under the touch sensing layer through an adhesive layer (such as an optical adhesive). However, since the surface properties of the light guide plate do not match those of a material of the adhesive layer with bendable properties, the bending resistance of the device is limited.

In view of this, how to provide a display device that can meet both optical design and bending properties is still one of objectives to be studied urgently in industry at present.

SUMMARY

One aspect of the present disclosure is a display device.

In an embodiment of the present disclosure, a display device includes a base layer, a touch sensing layer, a light guide module and a display panel. The touch sensing layer is disposed on the base layer. The light guide module is disposed on the touch sensing layer. The touch sensing layer is located between the light guide module and the display panel, and the touch sensing layer and one of the light guide module and the display panel have no adhesive material therebetween.

In an embodiment of the present disclosure, the touch sensing layer contacts the base layer.

In an embodiment of the present disclosure, the base layer includes a colorless polyimide layer and a water vapor barrier layer, and the water vapor barrier layer and the touch sensing layer are respectively located on two opposite sides of the colorless polyimide layer.

In an embodiment of the present disclosure, the base layer further includes a colorless polyimide layer and a water vapor barrier layer, and the colorless polyimide layer and the touch sensing layer are respectively located on two opposite sides of the water vapor barrier layer.

In an embodiment of the present disclosure, the touch sensing layer includes a third insulating layer, and the third insulating layer contacts the water vapor barrier layer.

In an embodiment of the present disclosure, the touch sensing layer includes a first sensing electrode, a first insulating layer, a second sensing electrode, and a second insulating layer, wherein the first sensing electrode is located between the base layer and the first insulating layer, and the second sensing electrode is located between the first insulating layer and the second insulating layer.

In an embodiment of the present disclosure, the first insulating layer contacts the base layer.

In an embodiment of the present disclosure, the touch sensing layer further includes a third insulating layer, the third insulating layer is located between the base layer and the first sensing electrode, and the third insulating layer contacts the base layer.

In an embodiment of the present disclosure, materials of the first sensing electrode and the second sensing electrode are nano conductive materials.

In an embodiment of the present disclosure, the display device further includes a light guide plate and a circuit shielding layer.

In an embodiment of the present disclosure, a material of the light guide plate includes thermoplastic polyurethanes (Thermoplastic polyurethanes, TPU).

In an embodiment of the present disclosure, the light guide plate includes a hard coating layer and an anti-glare layer.

Another aspect of the present disclosure is a display device.

In an embodiment of the present disclosure, the display device includes a base layer, a touch sensing layer, an integrated module, and a display panel. The touch sensing layer is disposed on the base layer. The integrated module is disposed on the touch sensing layer. The touch sensing layer is located between the integrated module and the display panel, and the integrated module and the touch sensing layer have no adhesive material therebetween.

In an embodiment of the present disclosure, the display device further includes a water vapor barrier layer, wherein the touch sensing layer is located between the base layer and the water vapor barrier layer, and the water vapor barrier layer is located between the touch sensing layer and the display panel.

Another aspect of the present disclosure is a fabrication method of a display device.

In an embodiment of the present disclosure, the fabrication method of a display device includes: forming a touch sensing layer on a base layer so that the touch sensing layer directly contacts the base layer; disposing a light guide module on one side of the touch sensing layer; and disposing a display panel on the other side of the touch sensing layer and the base layer, wherein the touch sensing layer and one of the light guide module and the display panel have no adhesive material therebetween.

In an embodiment of the present disclosure, forming the touch sensing layer on the base layer includes: forming a first sensing electrode on a colorless polyimide layer; forming a first insulating layer on the first sensing electrode; forming a second sensing electrode on the first insulating layer; and forming a second insulating layer on the second sensing electrode.

In an embodiment of the present disclosure, the fabrication method of a display device further includes: forming a third insulating layer between the base layer and the first sensing electrode so that the third layer contacts the base layer.

In an embodiment of the present disclosure, the base layer includes a colorless polyimide layer and a water vapor barrier layer, and forming the touch sensing layer on the base layer includes locating the colorless polyimide layer between the water vapor barrier layer and the touch sensing layer.

In an embodiment of the present disclosure, the base layer includes a colorless polyimide layer and a water vapor barrier layer, and forming the touch sensing layer on the base layer includes locating the water vapor barrier layer between the colorless polyimide layer and the touch sensing layer.

In an embodiment of the present disclosure, forming the light guide module further includes: forming a light guide plate with thermoplastic polyurethanes (Thermoplastic polyurethanes, TPU); forming a circuit shielding layer on an upper surface of the light guide plate; forming a hard coating layer or an anti-glare coating on the upper surface of the light guide plate; and forming a dot structure on a lower surface of the light guide plate.

Another aspect of the present disclosure is a fabrication method of a display device.

In an embodiment of the present disclosure, the fabrication method of a display device includes: providing a display panel, wherein the display panel includes a substrate, an electronic ink layer, a lower electrode, and an upper electrode; forming a base layer covering the upper electrode of the display panel; forming a touch sensing layer on the base layer so that the touch sensing layer directly contacts the base layer; and disposing a light guide module on the other side of the touch sensing layer opposite to the display panel, wherein forming the touch sensing layer includes: forming a first sensing electrode, a first insulating layer, a second sensing electrode, and a second insulating layer in sequence.

Another aspect of the present disclosure is a fabrication method of a display device.

In an embodiment of the present disclosure, the fabrication method of a display device includes: forming a touch sensing layer on a base layer; forming an integrated module on the base layer, wherein the integrated module includes a circuit shielding layer located on one surface of the base layer and a hard coating layer or an anti-glare layer located on the other surface of the base layer; and disposing a light guide plate between the touch sensing layer and a display panel.

In an embodiment of the present disclosure, the fabrication method of a display device further includes: forming a water vapor barrier layer on the display panel, wherein the touch sensing layer is located between the base layer and the water vapor barrier layer.

Another technical aspect of the present disclosure is a fabrication method of a light guide touch module.

In an embodiment of the present disclosure, the fabrication method of a light guide touch module includes: forming a light guide module, wherein forming the light guide module includes providing a light guide plate, forming a circuit shielding layer on an upper surface of the light guide plate, forming a hard coating layer or an anti-glare layer on the upper surface of the light guide plate, and forming a dot structure on a lower surface of the light guide plate; forming a touch sensing layer, including providing a base layer, forming a first sensing electrode on the base layer, forming a first insulating layer on the first sensing electrode, forming a second sensing electrode on the first insulating layer, and forming a second insulating layer on the second sensing electrode; and attaching the dot structure in the light guide module to the second insulating layer or the base layer in the touch sensing layer by means of an adhesive layer.

In the foregoing embodiments, according to the display device, the touch sensing layer can be integrated into the display device or the light guide module by means of the base layer, to decrease the number of adhesive layers of the entire display device and reduce the overall thickness of the display device. As such, the display device can be made lighter and thinner, the bending properties of the display device can be improved, process steps of the display device can be reduced, and the complexity of the fabrication process can be simplified.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
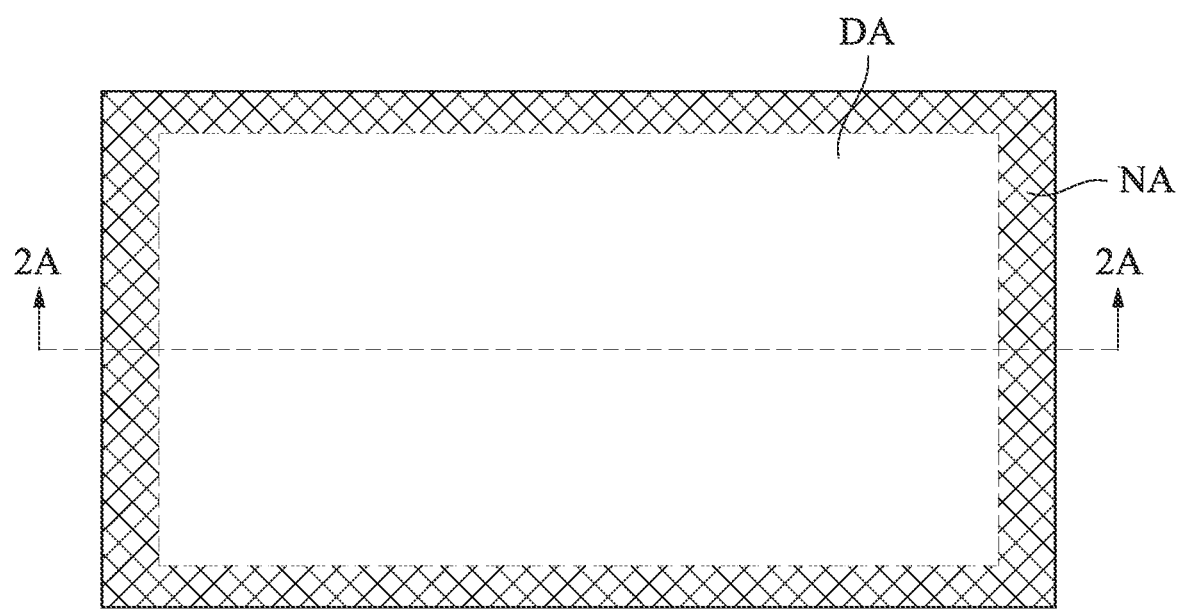
FIG. 1 is a top view of a display device according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2A:
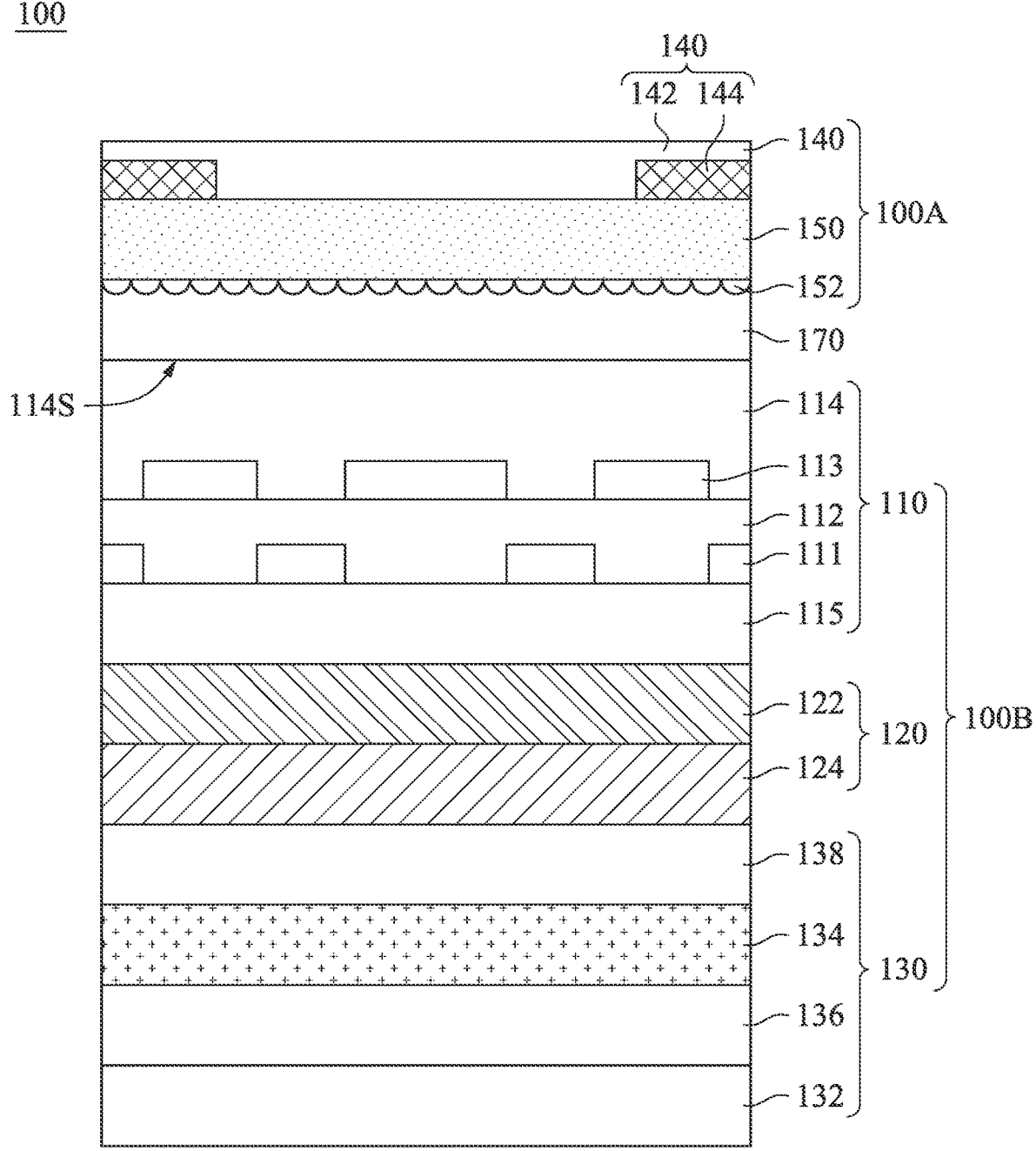
FIG. 2A is a cross-sectional view along a line 2A-2A of FIG. 1.

FIG. 1 is a top view of a display device 100 according to an embodiment of the present disclosure. FIG. 2A is a cross-sectional view along a line 2A-2A of FIG. 1. The display device 100 has a display area DA and a non-display area NA. The display device 100 includes a light guide module 100A and an integrated module 100B. The integrated module 100B includes a touch sensing layer 110, a base layer 120, and a display panel 130. The light guide module 100A includes a cover structure 140 and a light guide plate 150.

The touch sensing layer 110 is disposed on the base layer 120, and the light guide module 100A is located on the touch sensing layer 110. The touch sensing layer 110 is located between the light guide module 100A and the base layer 120, and the base layer 120 is located between the touch sensing layer 110 and the display panel 130. The display panel 130 and the touch sensing layer 110 have no adhesive material (such as an optical adhesive) therebetween. Specifically, the base layer 120 and the touch sensing layer 110 have no adhesive material therebetween, and the base layer 120 and the display panel 130 also have no adhesive material therebetween.

The base layer 120 includes a colorless polyimide layer 122 (CPI) and a water vapor barrier layer 124. The water vapor barrier layer 124 and the touch sensing layer 110 are respectively located on two opposite sides of the colorless polyimide layer 122. A material of the water vapor barrier layer 124 may include a composite film layer of an organic material and an inorganic material, but this disclosure is not limited to this. In this embodiment, the touch sensing layer 110 directly contacts the colorless polyimide layer 122, that is, the touch sensing layer 110 is directly formed on the base layer 120.

The display panel 130 is a reflective display panel. The display panel 130 includes a substrate 132, an electronic ink layer 134, a lower electrode 136, and an upper electrode 138. The electronic ink layer 134 is located between the lower electrode 136 and the upper electrode 138. The upper electrode 138 is located between the water vapor barrier layer 124 and the electronic ink layer 134. In this embodiment, the display panel 130 directly contacts the water vapor barrier layer 124, that is, the display panel 130 is directly disposed on the base layer 120.

The touch sensing layer 110 includes a first sensing electrode 111, a first insulating layer 112, a second sensing electrode 113, and a second insulating layer 114. The first sensing electrode 111 is located between the base layer 120 and the first insulating layer 112, and the second sensing electrode 113 is located between the first insulating layer 112 and the second insulating layer 114. In this embodiment, the touch sensing layer 110 further includes a third insulating layer 115, and the third insulating layer 115 is located between the base layer 120 and the first sensing electrode 111. The third insulating layer 115 contacts the colorless polyimide layer 122 of the base layer 120, the first sensing electrode 111, and the first insulating layer 112.

In the present embodiment, materials of the first sensing electrode 111 and the second sensing electrode 113 include a nano conductive material. For example, the nano conductive material is nano metal particles, such as, silver nanoparticles or copper nanoparticles mixed in the organic material. As such, the limitation of the materials of the first sensing electrode 111 and the second sensing electrode 113 on the bending degree can be reduced, thereby improving the bendability of the touch sensing layer 110.

In the display device 100 of the present disclosure, the colorless polyimide layer 122 and the water vapor barrier layer 124 are used as a base of the touch sensing layer 110, thereby the touch sensing layer 110 is integrated into the display panel 130. Therefore, the display panel 130, the base layer 120, and the touch sensing layer 110 can collectively form the integrated module 100B. As such, the touch sensing layer 110 and the display panel 130 do not need to be bonded by means of an adhesive layer, so that the overall thickness of the display device 100 can be reduced and the bending resistance of the display device 100 can be improved. In addition, the first sensing electrode 111 and the second sensing electrode 113 including the nano metal particles can overcome the shortcomings of conventional electrode materials (such as a transparent conductive film) that are brittle and not easy to bend. Therefore, the bendability of the entire display device 100 can be improved, which is beneficial to the application in large-sized and flexible products.

The light guide plate 150 is located between the touch sensing layer 110 and the cover structure 140. The light guide plate 150 and the cover structure 140 have no adhesive material therebetween, that is, the cover structure 140 is directly disposed above the light guide plate 150.

The cover structure 140 may include a hard coating layer 142 (HC layer) and a circuit shielding layer 144. The hard coating layer 142 may also include an anti-glare layer (AG Layer). The circuit shielding layer 144 is located between the light guide plate 150 and the hard coating layer 142. The hard coating layer 142 can fill a gap between the circuit shielding layer 144 and the light guide plate 150 and provide a protection function for the light guide module 100A. The material of the light guide plate 150 includes thermoplastic polyurethanes (TPU) so that the light guide plate 150 has better toughness, resilience and self-repairing properties. The light guide plate 150 includes a dot structure 152 located between the surface of the light guide plate 150 facing the display panel 130, to enhance the uniformity of light entering the display panel 130. Therefore, the light guide plate 150, in addition to having a light guide effect, can also improve the self-repairing properties and bendability of the light guide module 100A. The circuit shielding layer 144 is, for example, deep color ink, which is located in the non-display area NA of the display panel 100, to define the display area DA and the non-display area NA.

Since the cover structure 140 can be integrated with the light guide plate 150, the cover structure 140 and the light guide plate 150 can collectively form the light guide module 100A. As such, the cover structure 140 and the light guide plate 150 do not need to be bonded by means of an adhesive layer, so that the overall thickness of the display device 100 can be reduced and the bending resistance of the display device 100 can be improved. That is, the light guide plate 150 and the cover structure 140 can be integrated into a single structure, for example, the circuit shielding layer 144 and the hard coating layer 142 or the anti-glare coating are sprayed directly on an upper surface of the light guide plate 150, and the dot structure 152 is sprayed directly on a lower surface of the light guide plate 150.

In this embodiment, materials of the first insulating layer 112, the second insulating layer 114, and the third insulating layer 115 include a polyester organic material, acrylic resin, acrylic resin, epoxy resin, polyimide resin, or a combination thereof. By disposing the third insulating layer 115 on the base layer 120, the adhesion between materials of the first sensing electrode 111 and the base layer 120 can be further enhanced, which is beneficial to the integration of the touch sensing layer 110 onto the display panel 130.

Thicknesses of the first sensing electrode 111 and the second sensing electrode 113 may be in a range of about 0.4 micron to 1 micron, and thicknesses of the first insulating layer 112 and the second insulating layer 114 may be in a range of about 0.5 micron to 2 microns, but the present disclosure is not limited in this regard. In other words, the thicknesses of the first insulating layer 112 and the second insulating layer 114 need to be greater than those of the first sensing electrode 111 and the second sensing electrode 113. In this embodiment, since the third insulating layer 115 is configured to enhance the adhesion between the base layer 120 and the first sensing electrode 111, the thickness of the third insulating layer 115 may be equal to or less than the thicknesses of the first insulating layer 112 and the second insulating layer 114. In other words, the thickness of the third insulating layer 115 may not need to be greater than the thicknesses of the first sensing electrode 111 and the second sensing electrode 113.

Since the touch sensing layer 110 of the present disclosure can be integrated into the display panel 130 through the base layer 120, the touch sensing layer 110 can be directly formed on the base layer 120. Therefore, the first sensing electrode 111 located in the display area DA and the non-display area NA of the display device 100 can be formed in the same etching and development process, and the second sensing electrode 113 located in the display area DA and the non-display area NA of the display device 100 can also be formed in the same etching and development process. In other words, it is not necessary to go through a bonding process first, and only after circuits of the touch sensing layer 110 in the display area DA are completed, wires are formed in the non-display area NA. Therefore, the integrated module 100B of the present disclosure can reduce process steps and simplify the complexity of the fabrication process. In some embodiments, line widths of the first sensing electrode 111 and the second sensing electrode 113 in the display area DA are in a range of about 3 microns to 5 microns, and the line widths of the first sensing electrode 111 and the second sensing electrode 113 in the non-display area of NA are in a range of about 8 microns to 30 microns, but the present disclosure is not limited in this regard.

In this embodiment, the light guide module 100A and the integrated module 100B are bonded through an adhesive layer 170. In other words, the dot structure 152 of the light guide plate 150 and a surface 114S of the second insulating layer 114 respectively contact two opposite sides of the adhesive layer 170, so that the light guide module 100A and the integrated module 100B are bonded to each other. Therefore, the design of the light guide module 100A and the integrated module 100B can enhance the bendability of the light guide module 100A and the integrated module 100B, decrease the number of adhesive layers of the entire display device 100, and reduce the overall thickness of the display device 100. As such, the display device 100 can be made lighter and thinner, the bending resistance of the display device 100 can be improved, process steps of the display device 100 can be reduced, and the complexity of the fabrication process can be simplified. In addition, the light guide plate 150 including the thermoplastic polyurethanes can reduce the difference in surface properties and the difference in bendability from the adhesive layer 170, and therefore, the bending resistance of the entire display device 100 can be improved, which is beneficial to the application in large-sized and flexible products.

Figure 2B:
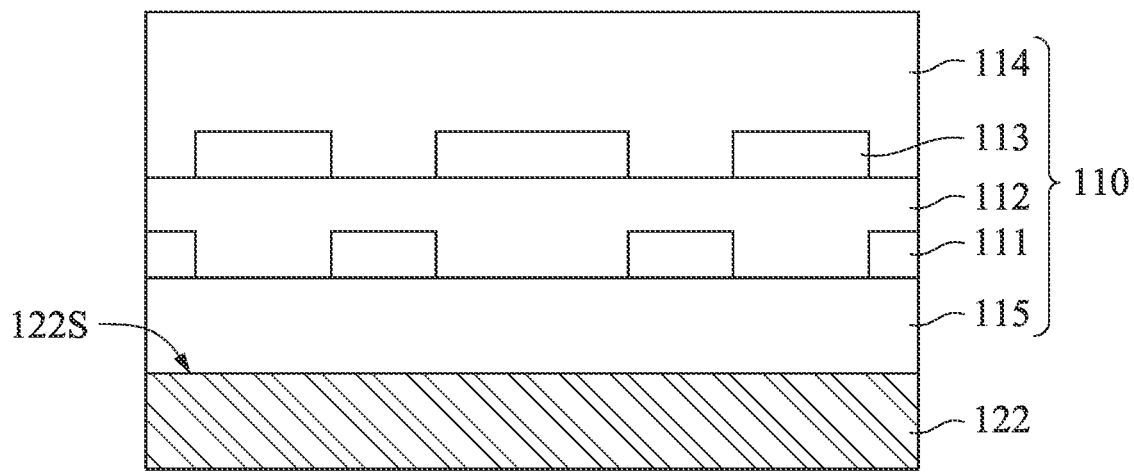
FIG. 2B to FIG. 2D are cross-sectional views of each steps of a fabrication method of the display device of FIG. 2A.
Figure 2C:
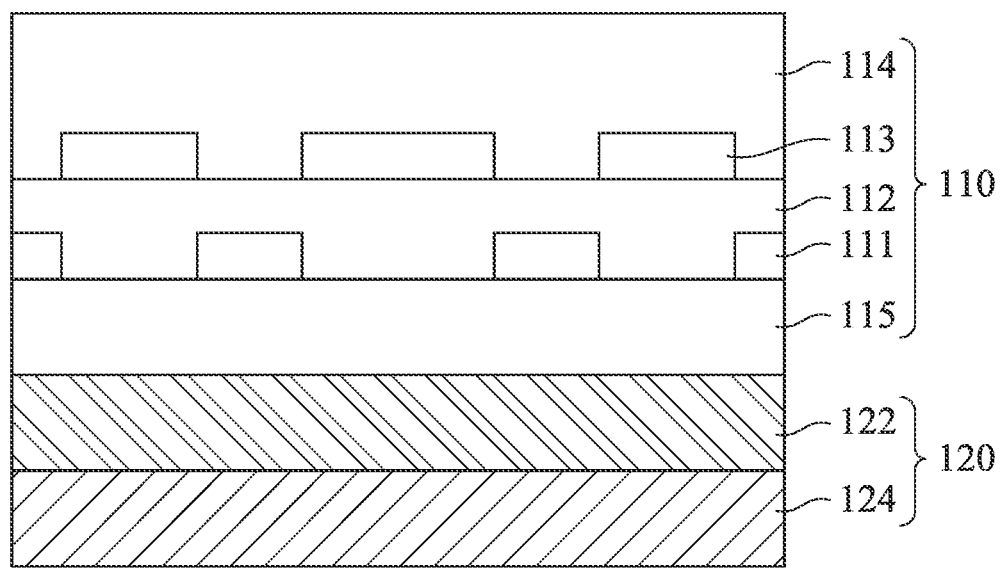
Figure 2D:
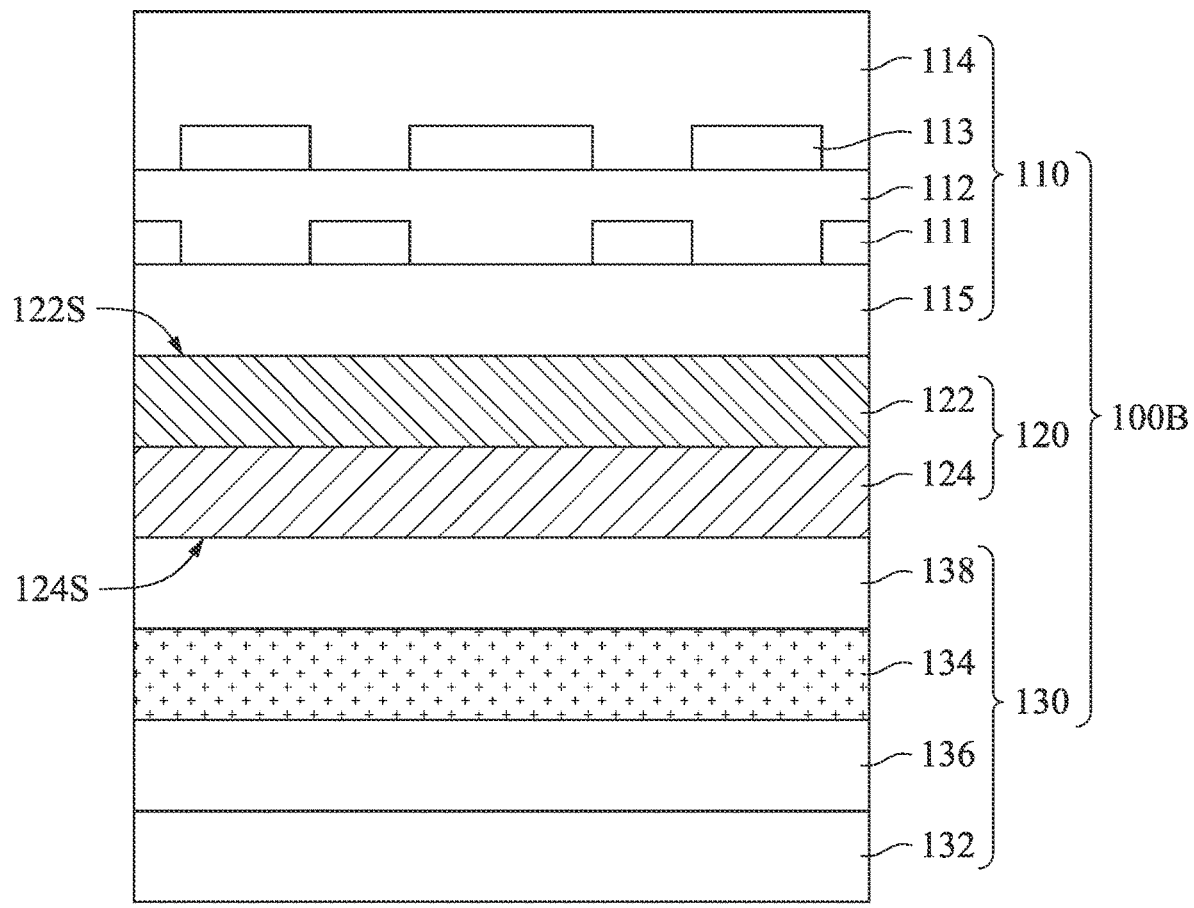

FIG. 2B to FIG. 2D are cross-sectional views of each steps of a fabrication method of the display device 100 of FIG. 2A. Reference is made to FIG. 2B, first, a touch sensing layer 110 is formed on a colorless polyimide layer 122 of a base layer 120 (see FIG. 2A). Forming the touch sensing layer 110 includes forming a third insulating layer 115 on the colorless polyimide layer 122, and the third insulating layer 115 contacts a surface 122S of the colorless polyimide layer 122. Subsequently, a first sensing electrode 111 is formed on the third insulating layer 115. That is, the third insulating layer 115 is located between the colorless polyimide layer 122 and the first sensing electrode 111. Circuits and wires of the first sensing electrode 111 located in a display area DA and a non-display area NA (see FIG. 1) are all formed through the same patterning process. Subsequently, a first insulating layer 112 is formed on the first sensing electrode 111, and then a second sensing electrode 113 is formed on the first insulating layer 112. Circuits and wires of the second sensing electrode 113 located in the display area DA and the non-display area NA (see FIG. 1) are all formed through the same patterning process. Finally, a second insulating layer 114 is formed on the second sensing electrode 113. In some embodiments, if a sheet-to-sheet process is adopted, the colorless polyimide layer 122 can be fixed on a glass substrate with a pyrolytic adhesive first, and then the touch sensing layer 110 can be formed. In some embodiments, if a roll-to-roll process is adopted, the pyrolytic adhesive can be used as a carrier plate. Therefore, the fabrication of the display device 100 is not limited to process methods.

Reference is made to FIG. 2C, the structure in FIG. 2C is separated from the glass substrate or the carrier plate, and then the water vapor barrier layer 124 is formed on the colorless polyimide layer 122, so that the colorless polyimide layer 122 is located between the water vapor barrier layer 124 and the touch sensing layer 110. In some embodiments, the steps in FIG. 2B and in FIG. 2C can be interchanged. That is, the water vapor barrier layer 124 can be first formed on the colorless polyimide layer 122 to form the base layer 120. Subsequently, each layer of the touch sensing layer 110 is formed on the base layer 120. In other words, the touch sensing layer 110 can just be formed by using the colorless polyimide layer 122 as a base, that is, the water vapor barrier 124 is formed first, and then the touch sensing layer 110 is made.

Reference is made to FIG. 2D, disposing the display panel 130 under the touch sensing layer 110 and the base layer 120, so that the base layer 120 is located between the display panel 130 and the touch sensing layer 110. Disposing the display panel 130 includes forming an upper electrode 138 on a surface 124S of the water vapor barrier layer 124 facing away from the colorless polyimide layer 122, and the upper electrode 138 contacts the surface 124S of the water vapor barrier layer 124. Subsequently, an electronic ink layer 134 is disposed between the upper electrode 138 and a lower electrode 136 located on the substrate 132. As such, an integrated module 100B can be obtained. The display panel 130 and the touch sensing layer 110 have no adhesive material therebetween. The touch sensing layer 110 is integrated into the display panel 130 through the base layer 120.

Reference is made to FIG. 2A, a circuit shielding layer 144 is formed on a hard coating layer 142, and then a cover structure 140 is directly disposed on a light guide plate 150. That is, the cover structure 140 can be formed by applying a material of the hard coating layer and/or embossing (for example, ultraviolet embossing) a material of an anti-glare layer. Alternatively, the circuit shielding layer 144 is directly formed on the light guide plate 150, and then the hard coating layer or the anti-glare layer is applied on the light guide plate 150. A dot structure 152 of the light guide plate 150 can be formed by printing, hot pressing, UV embossing and other processes. As such, a light guide module 100A can be obtained. The light guide plate 150 and the cover plate structure 140 have no adhesive material therebetween, so that the light guide plate 150 and the cover plate structure 140 are integrated. In other words, the base layer 120 can also be regarded as a part of the touch sensing layer 110, and the display device 100 can be regarded as a light guide touch module formed by attaching the dot structure 152 of the light guide module 100A to the second insulating layer 114 or the base layer 120 in the touch sensing layer 110 by means of an adhesive layer 170.

Figure 3:
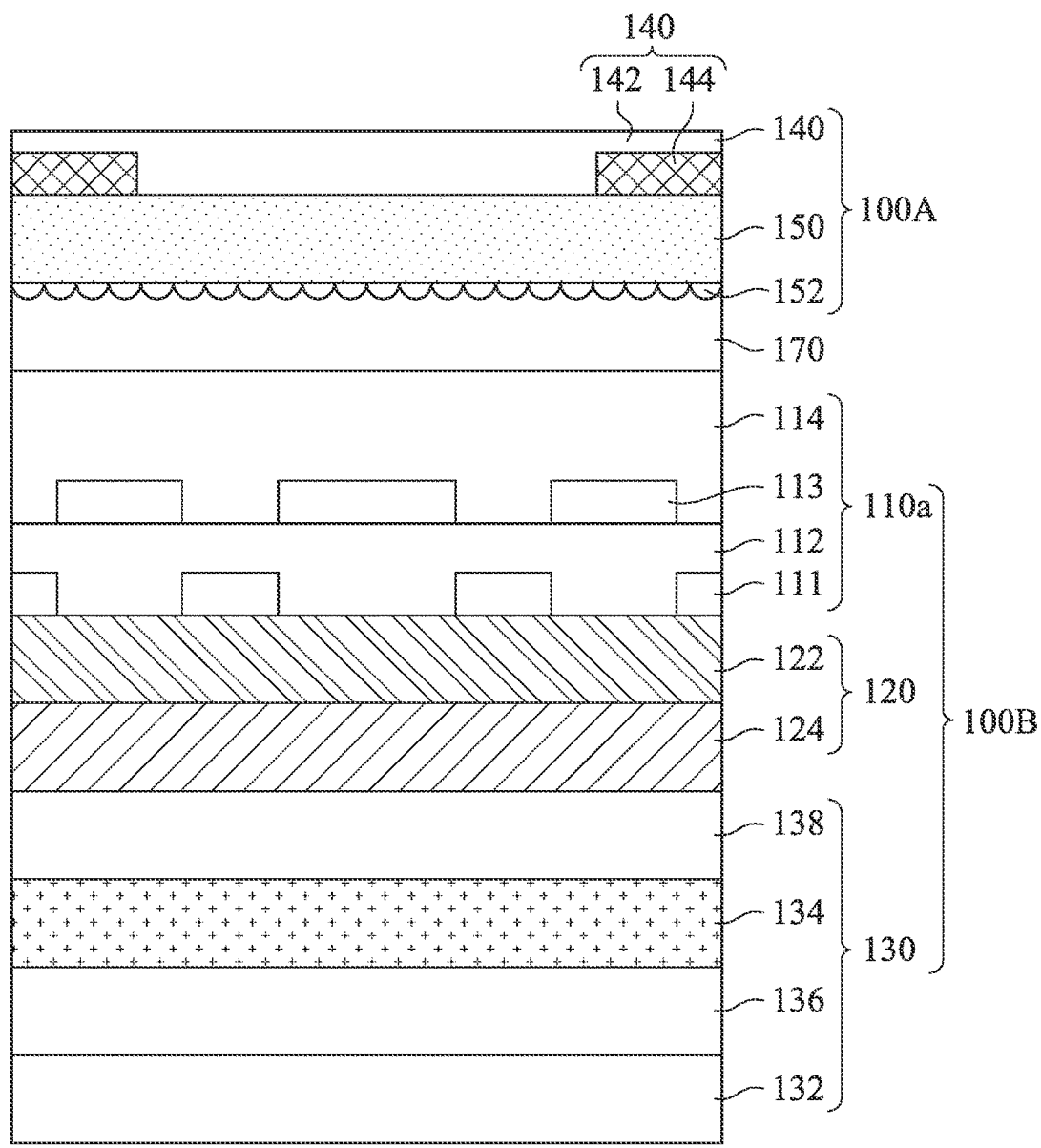
FIG. 3 is a cross-sectional view of a display device according to another embodiment of the present disclosure.

FIG. 3 is a cross-sectional view of a display device 100a according to another embodiment of the present disclosure. The display device 100a of FIG. 3 has the same cross-sectional position as the display device 100 of FIG. 2A. Reference is made to FIG. 2A and FIG. 3, the display device 100a is substantially the same as the display device 100, and the difference is that the display device 100a does not include the third insulating layer 115. In other words, the first sensing electrode 111 of the display device 100a is directly formed on the colorless polyimide layer 122. Both the first sensing electrode 111 and the first insulating layer 112 directly contact the colorless polyimide layer 122. In this embodiment, since the first sensing electrode 111 and the colorless polyimide layer 122 can have sufficient adhesion therebetween, the third insulating layer 115 of the display device 100 can be optionally omitted. The touch sensing layer 110a of the display device 100a is also integrated into the display panel 130 by means of the base layer 120, and therefore, the display device 100a has the same technical effect as the display device 100. Details are not described herein again.

Figure 4A:
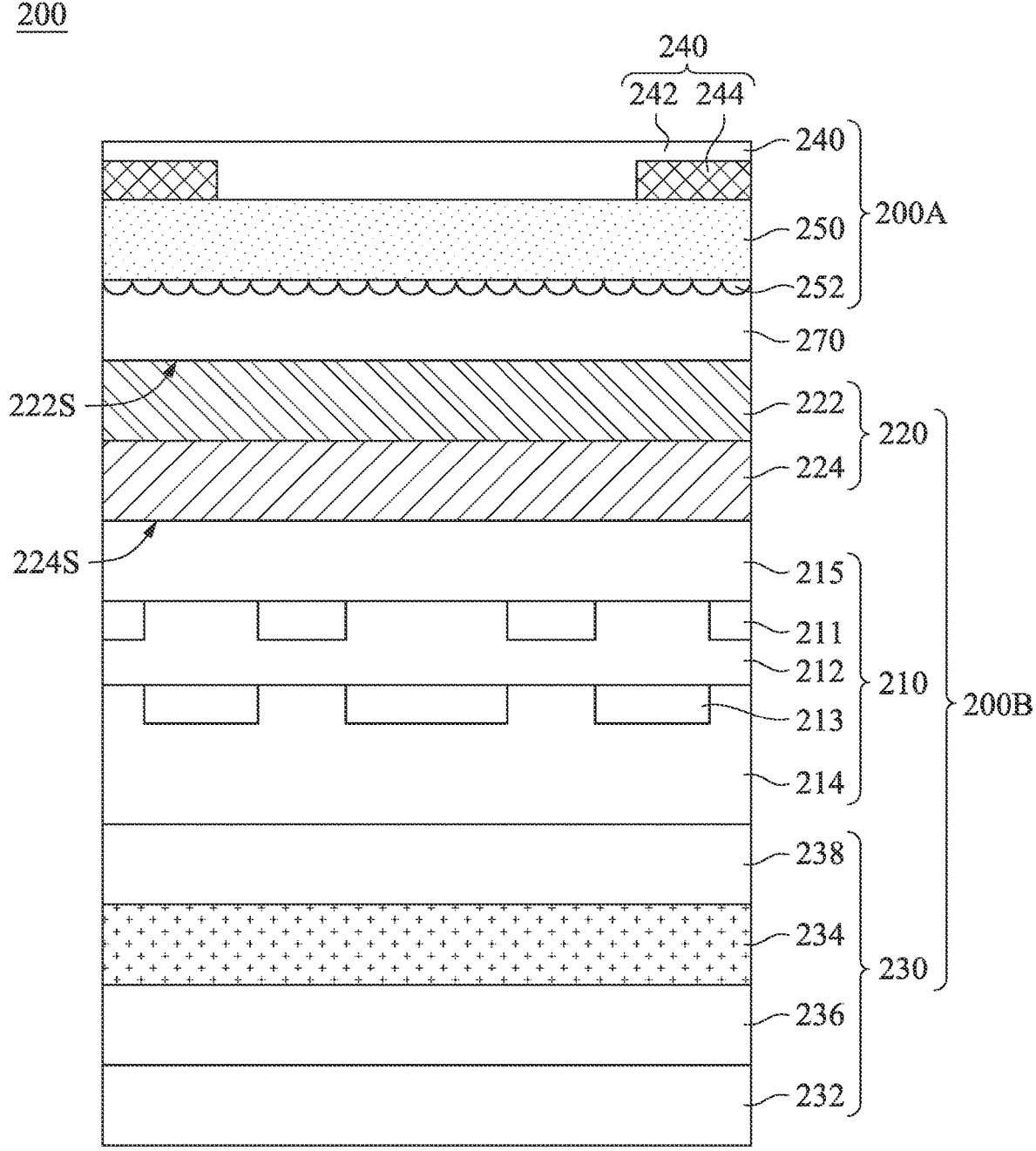
FIG. 4A is a cross-sectional view of a display device according to another embodiment of the present disclosure.

FIG. 4A is a cross-sectional view of a display device 200 according to another embodiment of the present disclosure. The display device 200 of FIG. 4A has the same cross-sectional position as the display device 100 of FIG. 2A. The display device 200 includes a light guide module 200A and an integrated module 200B. The integrated module 200B includes a touch sensing layer 210, a base layer 220, and a display panel 230. The light guide module 200A includes a cover plate structure 240 and a light guide plate 250.

The touch sensing layer 210 and the light guide module 200A are located on two opposite sides of the base layer 220. The touch sensing layer 210 is located between the base layer 220 and the display panel 230, that is, the base layer 220 is located between the touch sensing layer 210 and the cover plate structure 240. The display panel 230 and the touch sensing layer 210 have no adhesive material therebetween, and the base layer 220 and the touch sensing layer 210 have no adhesive material therebetween.

The base layer 220 includes a colorless polyimide layer 222 and a water vapor barrier layer 224. The colorless polyimide layer 222 and the touch sensing layer 210 are respectively located on two opposite sides of the water vapor barrier layer 224. In this embodiment, the touch sensing layer 210 directly contacts a surface 224S of the water vapor barrier layer 224, that is, the touch sensing layer 210 is directly formed on the base layer 220.

The display panel 230 includes a substrate 232, an electronic ink layer 234, a lower electrode 236, and an upper electrode 238. The electronic ink layer 234 is located between the lower electrode 236 and the upper electrode 238. The upper electrode 238 is located between the touch sensing layer 210 and the electronic ink layer 234. In this embodiment, the touch sensing layer 210 directly contacts the display panel 230.

The touch sensing layer 210 includes a first sensing electrode 211, a first insulating layer 212, a second sensing electrode 213, a second insulating layer 214, and a third insulating layer 215. The first sensing electrode 211 is located between the third insulating layer 215 and the first insulating layer 212, and the second sensing electrode 213 is located between the first insulating layer 212 and the second insulating layer 214. The third insulating layer 215 is located between the base layer 220 and the first sensing electrode 211. In this embodiment, the second insulating layer 214 directly contacts the upper electrode 238 of the display panel 230, and the third insulating layer 215 directly contacts the water vapor barrier layer 224 of the base layer 220, the first sensing electrode 211, and the first insulating layer 212. In this embodiment, since the adhesion between the first sensing electrode 211 and the water vapor barrier layer 224 is poor, the third insulating layer 215 is needed to enhance the adhesion of the first sensing electrode 211 on the base layer 220.

Materials, fabrication processes and technical effects of the first sensing electrode 211 and the second sensing electrode 213 are the same as those of the display device 100 shown in FIG. 2A, and structural features such as thickness and width, and technical effect of each layer in the touch sensing layer 210 are also the same as those of the display device 100. Details are not described hereinafter.

In the display device 200 of the present disclosure, the colorless polyimide layer 222 and the water vapor barrier layer 224 are used as a base of the touch sensing layer 210, and the touch sensing layer 210 is integrated between the base layer 220 and the display panel 230. Therefore, the display panel 230, the base layer 220, and the touch sensing layer 210 can collectively form the integrated module 200B. As such, the touch sensing layer 210 and the display panel 230 do not need to be bonded by means of an adhesive layer, so that the overall thickness of the display device 200 is reduced.

The cover plate structure 240 and the light guide plate 250 constitute a light guide module 200A. The light guide module 200A has the same structure and technical effect as the light guide module 100A of FIG. 2A, and details are not described hereinafter.

In this embodiment, the light guide module 200A and the integrated module 200B are bonded through an adhesive layer 270. In other words, the dot structure 252 of the light guide plate 250 and a surface 222S of the colorless polyimide layer 222 respectively contact two opposite sides of the adhesive layer 270, so that the light guide module 200A and the integrated module 200B are bonded to each other. The design of the light guide module 200A and the integrated module 200B can enhance the bendability of the light guide module 200A and the integrated module 200B, decrease the number of adhesive layers of the entire display device 200, and reduce the overall thickness of the display device 200. As such, the display device 200 can be made lighter and thinner, the bending resistance of the display device 200 can be improved, process steps of the display device 200 can be reduced, and the complexity of the fabrication process can be simplified.

Figure 4B:
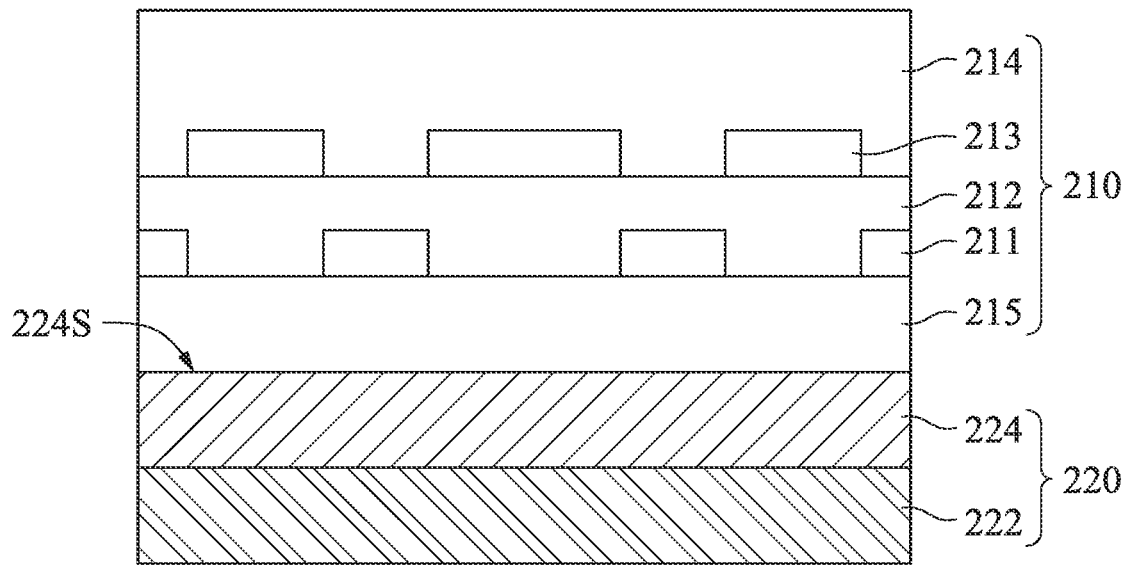
FIG. 4B to FIG. 4C are cross-sectional views of each steps of a fabrication method of the display device of FIG. 4A.
Figure 4C:
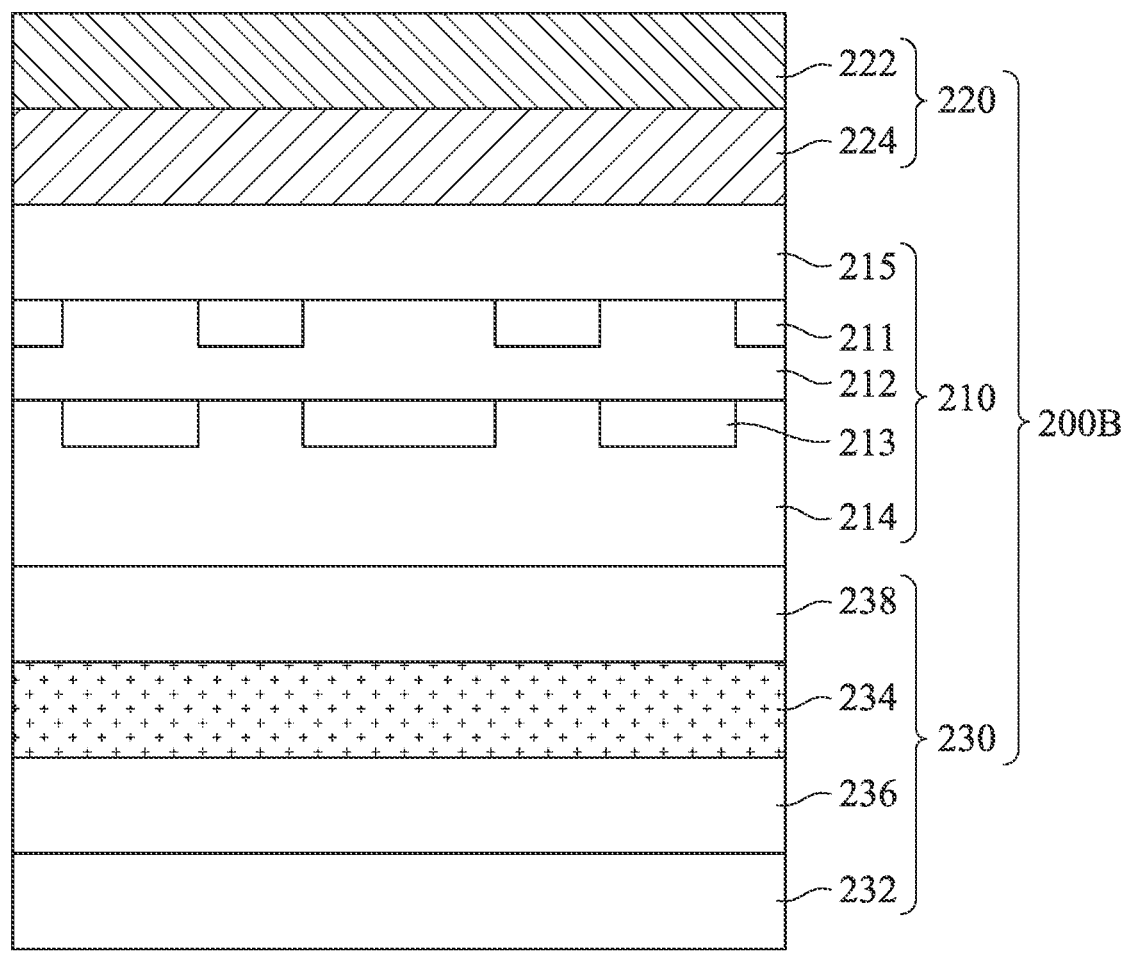

FIG. 4B to FIG. 4C are cross-sectional views of each steps of a fabrication method of the display device 200 of FIG. 4A. Reference is made to FIG. 4B, the touch sensing layer 210 is formed on the water vapor barrier layer 224 of the base layer 220 first, so that the third insulating layer 215 directly contacts the surface 224S of the water vapor barrier layer 224. As described above, the base layer 220 can be fixed on a glass substrate or a carrier plate first, and then the touch sensing layer 210 can be formed. The fabrication method of the touch sensing layer 210 is the same as that of the touch sensing layer 110 of the display device 100 shown in FIG. 2A, and details are not described herein again.

Reference is made to FIG. 4B and FIG. 4C, the display panel 230 is disposed on the touch sensing layer 210, so that the touch sensing layer 210 is located between the display panel 230 and the base layer 220. Disposing the display panel 230 includes forming the upper electrode 238 on the second insulating layer 214. Subsequently, the structure in FIG. 4B is separated from the glass substrate or the carrier plate, and the electronic ink layer 234 is disposed between the upper electrode 238 and the lower electrode 236 located on the substrate 232. As such, the integrated module 200B can be obtained. The display panel 230 and the touch sensing layer 210 have no adhesive material therebetween, so that the touch sensing layer 210 is integrated between the base layer 220 and the display panel 230.

Reference is made to FIG. 4A, a circuit shielding layer 244 is formed on a hard coating layer 242, and then a cover plate structure 240 is directly disposed on the light guide plate 250. A fabrication approach of the cover plate structure 240 is the same as that of the display device 100 in FIG. 2A, and details are not described hereinafter. As such, the light guide module 200A can be obtained. The light guide plate 250 and the cover plate structure 240 have no adhesive material therebetween, and the light guide plate 250 and the cover plate structure 240 have no adhesive material therebetween, so that the light guide plate 250 and the cover plate structure 240 are integrated.

Figure 5A:
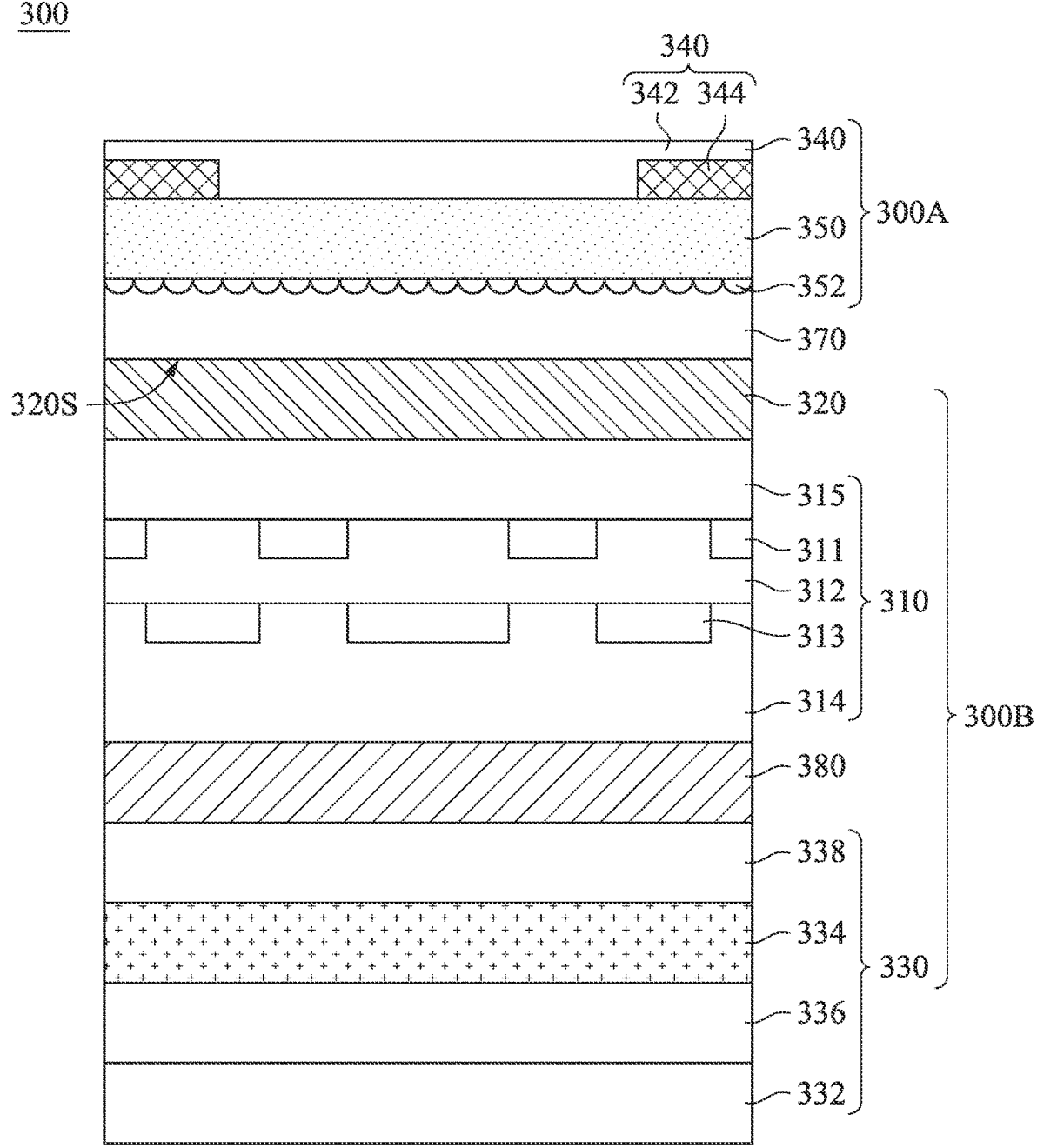
FIG. 5A is a cross-sectional view of a display device according to another embodiment of the present disclosure.

FIG. 5A is a cross-sectional view of a display device 300 according to another embodiment of the present disclosure. The display device 300 of FIG. 5A has the same cross-sectional position as the display device 100 of FIG. 2A. The display device 300 is substantially the same as the display device 200 of FIG. 4A, and the difference is that a touch sensing layer 310 of the display device 300 is located between a base layer 320 and a water vapor barrier layer 380, and the water vapor barrier layer 380 is located between the touch sensing layer 310 and a display panel 330. The base layer 320 of the display device 300 is a colorless polyimide layer. In this embodiment, a third insulating layer 315 of the touch sensing layer 310 directly contacts the base layer 320, a second insulating layer 314 of the touch sensing layer 310 and an upper electrode 338 of the display panel 330 are directly contact two opposite sides of the water vapor barrier layer 380, respectively. Therefore, the base layer 320, the touch sensing layer 310, the water vapor barrier layer 380, and the display panel 330 can collectively form an integrated module 300B.

A light guide module 300A of the display device 300 and the integrated module 300B are bonded through an adhesive layer 370. In other words, a dot structure 352 of the light guide plate 350 and a surface 320S of the base layer 320 respectively contact two opposite sides of the adhesive layer 370, so that the light guide module 300A and the integrated module 300B are bonded to each other. The design of the light guide module 300A and the integrated module 300B can enhance the bendability of the light guide module 300A and the integrated module 300B, decrease the number of adhesive layers of the entire display device 300, and reduce the overall thickness of the display device 300. As such, the display device 300 can be made lighter and thinner, the bending properties of the display device 300 can be improved, process steps of the display device 300 can be reduced, and the complexity of the fabrication process can be simplified. The display device 300 has the same technical effect as the display device 200, and details are not described hereinafter.

Figure 5B:
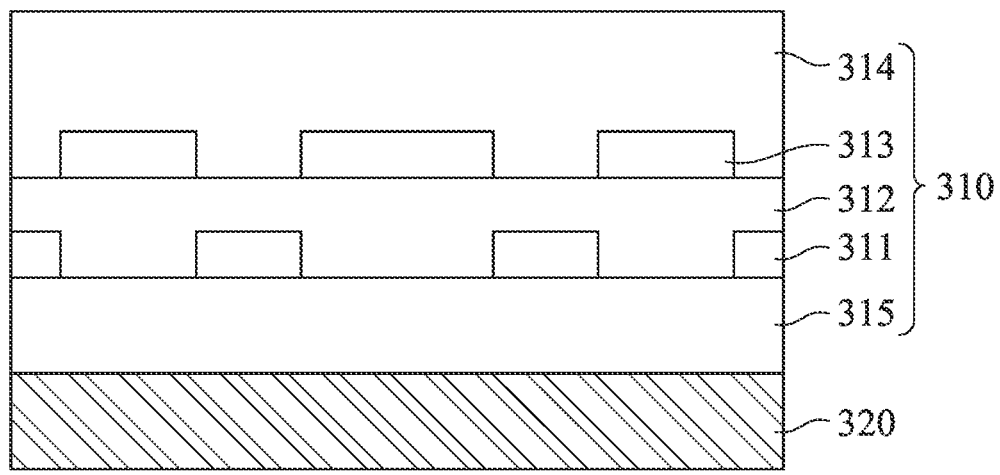
FIG. 5B to FIG. 5D are cross-sectional views of each steps of a fabrication method of the display device of FIG. 5A.
Figure 5C:
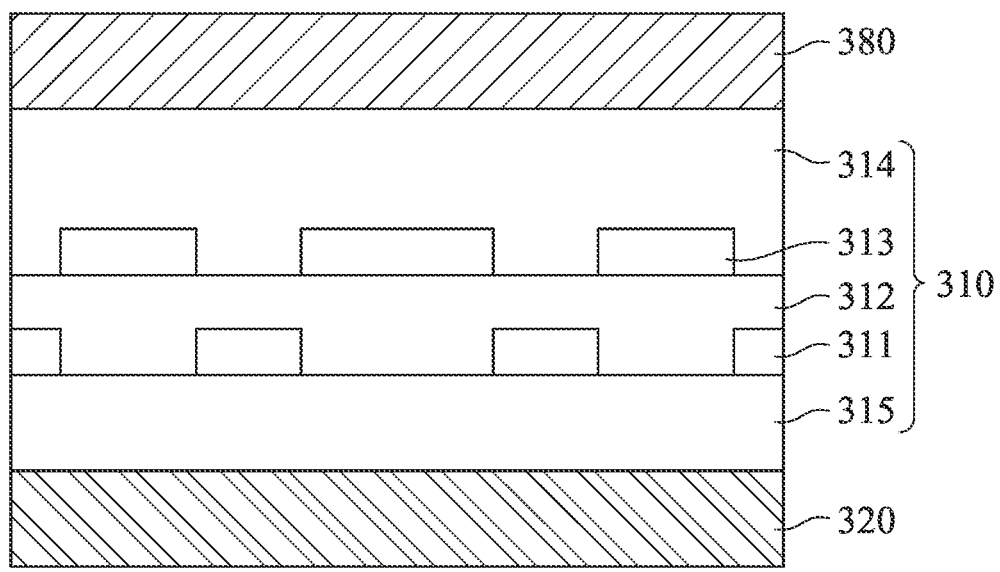
Figure 5D:
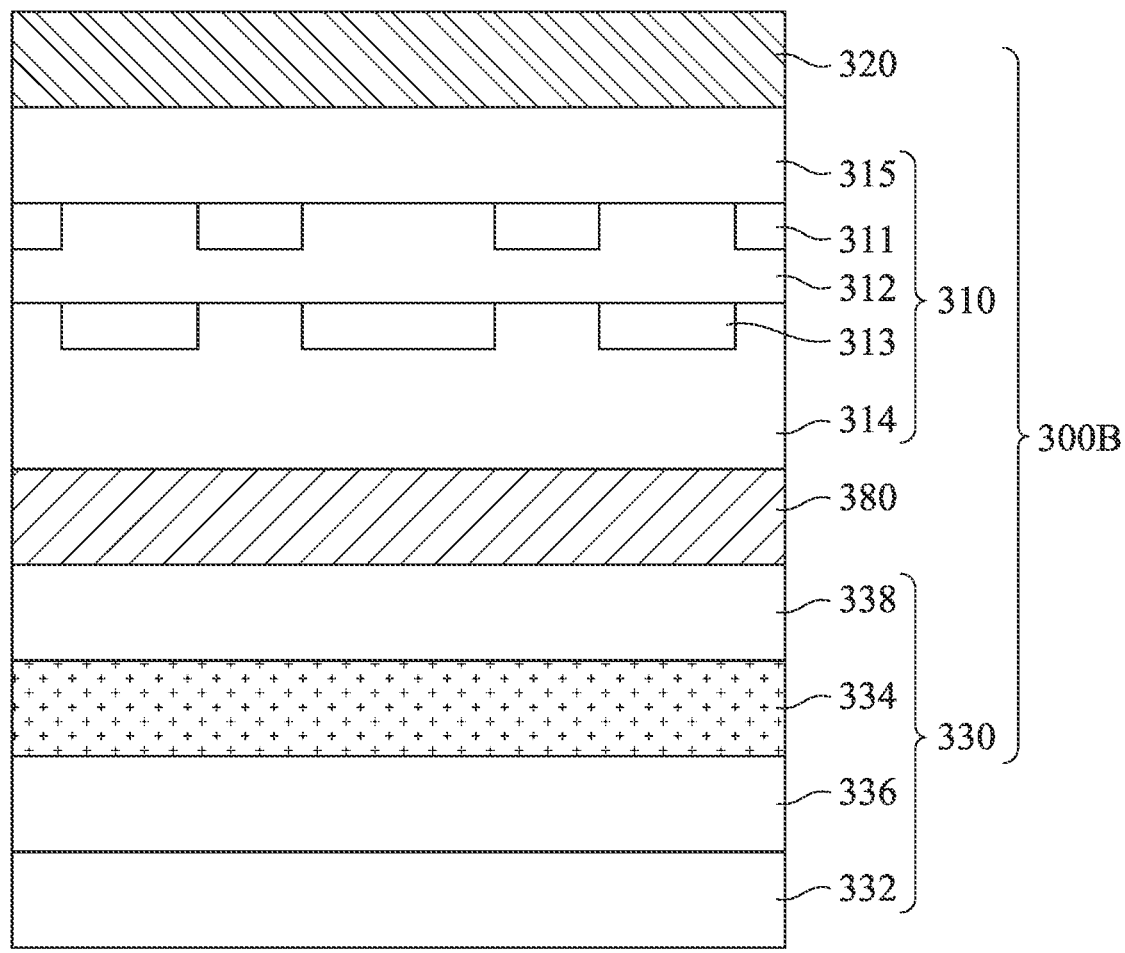

FIG. 5B to FIG. 5D are cross-sectional views of each steps of a fabrication method of the display device 300 of FIG. 5A. Reference is made to FIG. 5B, the touch sensing layer 310 is formed on the base layer 320 first. As described above, the base layer 320 can be fixed on a glass substrate or a carrier plate first, and then the touch sensing layer 310 can be formed. The fabrication method of the touch sensing layer 310 is the same as that of the touch sensing layer 110 of the display device 100 shown in FIG. 2A, and details are not described hereinafter. In this embodiment, the third insulating layer 315 of the touch sensing layer 310 directly contacts the base layer 320.

Reference is made to FIG. 5C, the water vapor barrier layer 380 is formed on the touch sensing layer 310, so that the touch sensing layer 310 is located between the water vapor barrier layer 380 and the base layer 320. In this embodiment, the second insulating layer 314 of the touch sensing layer 310 directly contacts the water vapor barrier layer 380.

Reference is made to FIG. 5D, the display panel 330 is disposed on the water vapor barrier layer 380, so that the water vapor barrier layer 380 is located between the touch sensing layer 310 and the display panel 330. Disposing the display panel 330 includes forming the upper electrode 338 on the water vapor barrier layer 380. Subsequently, the structure in FIG. 5C is separated from the glass substrate or the carrier plate, and an electronic ink layer 334 is disposed between the upper electrode 338 and a lower electrode 336 located on a substrate 332. As such, the integrated module 300B can be obtained. The display panel 330 and the touch sensing layer 310 have no adhesive material therebetween, so that the touch sensing layer 310 and the display panel 330 are integrated.

Reference is made to FIG. 5A, a circuit shielding layer 344 is formed on a hard coating layer 342, and then a cover plate structure 340 is directly disposed on the light guide plate 350. As such, the light guide module 300A can be obtained. The light guide plate 350 and the cover plate structure 340 have no adhesive material therebetween, so that the light guide plate 350 and the cover plate structure 340 are integrated.

Figure 6:
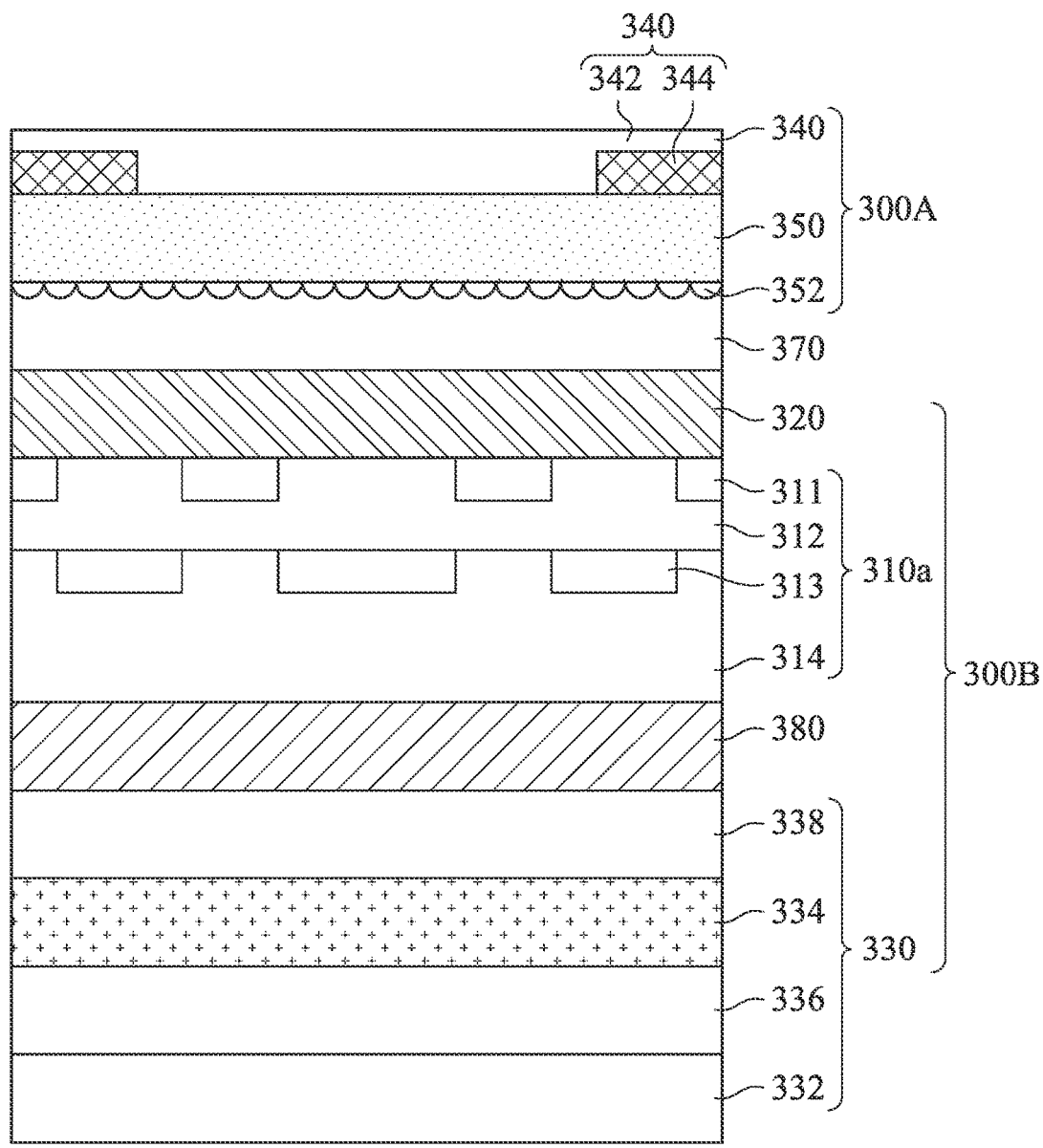
FIG. 6 is a cross-sectional view of a display device according to another embodiment of the present disclosure.

FIG. 6 is a cross-sectional view of a display device 300a according to another embodiment of the present disclosure. The display device 300a of FIG. 6 has the same cross-sectional position as the display device 100 of FIG. 2A. Reference is made to FIG. 5A and FIG. 6, the display device 300a is substantially the same as the display device 300, and the difference is that the touch sensing layer 310a of the display device 300a does not include the third insulating layer 315. In other words, the first sensing electrode 311 of the display device 300a is directly formed on the base layer 320. Both the first sensing electrode 311 and the first insulating layer 312 contact the base layer 320. In this embodiment, since the first sensing electrode 311 and the base layer 320 can have sufficient adhesion therebetween, the third insulating layer 315 of the display device 300 can be optionally omitted. The display device 300a has the same technical effect as the display device 300, and details are not described hereinafter.

Figure 7A:
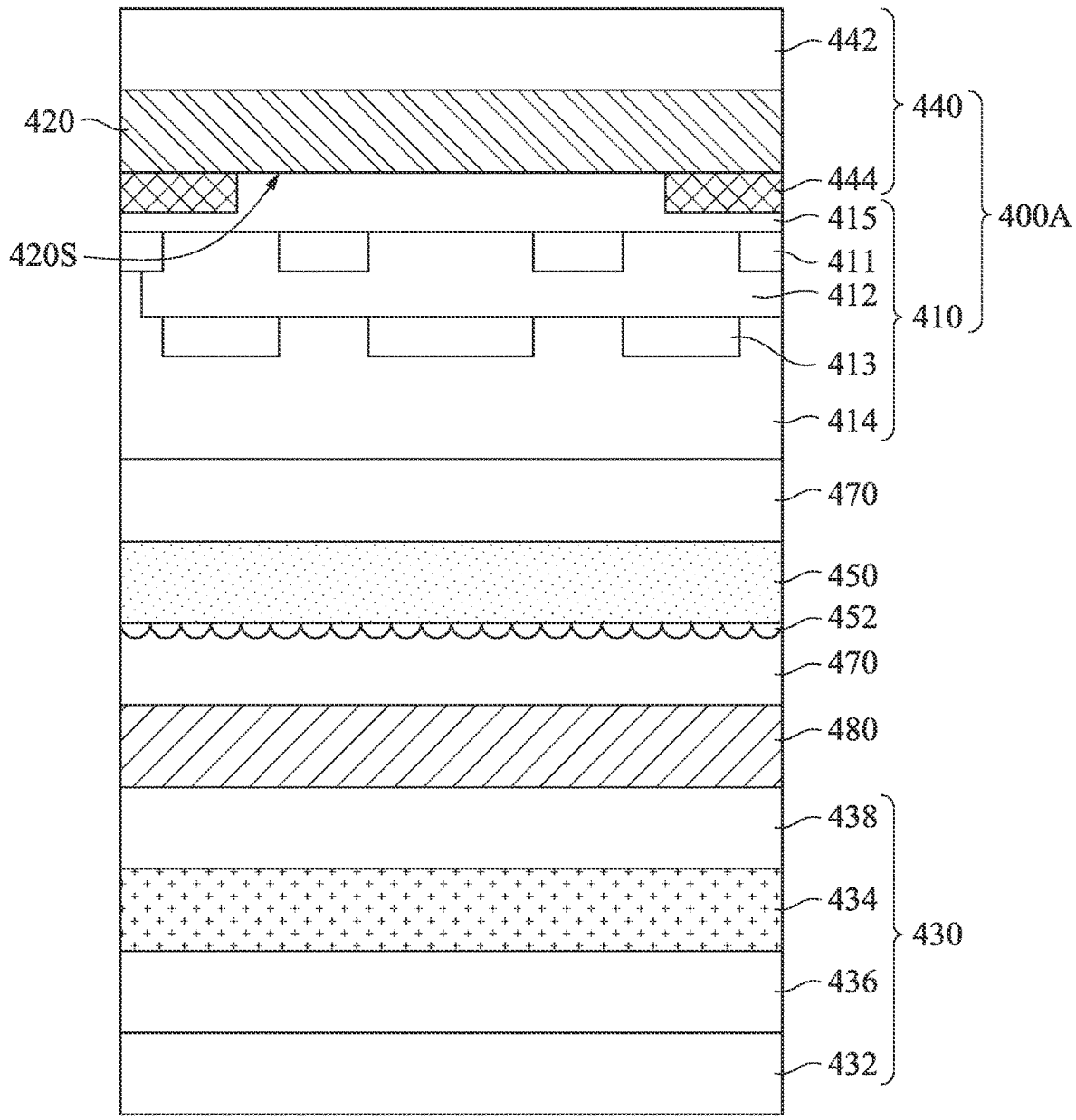
FIG. 7A is a cross-sectional view of a display device according to another embodiment of the present disclosure.

FIG. 7A is a cross-sectional view of a display device 400 according to another embodiment of the present disclosure. The display device 400 of FIG. 7A has the same cross-sectional position as the display device 100 of FIG. 2A. The display device 400 includes a first integrated module 400A and a display panel 430. The first integrated module 400A includes a touch sensing layer 410, a base layer 420 and a cover plate structure 440.

In this embodiment, the base layer 420 is a colorless polyimide layer. The cover plate structure 440 includes a hard coating layer 442 (HC layer) and a circuit shielding layer 444. The hard coating layer 442 may include an anti-glare layer (AG Layer). The touch sensing layer 410 and the cover plate structure 440 are respectively disposed on two opposite sides of the base layer 420. The touch sensing layer 410 includes a third insulating layer 415, a first sensing electrode 411, a first insulating layer 412, a second sensing electrode 413, and a second insulating layer 414. The third insulating layer 415 is located between the base layer 420 and the first sensing electrode 411. The first insulating layer 411 is located between the third insulating layer 415 and the first insulating layer 412, and the second sensing electrode 413 is located between the first insulating layer 412 and the second insulating layer 414.

Materials, fabrication processes and technical effects of the first sensing electrode 411 and the second sensing electrode 413 are the same as those of the display device 100 shown in FIG. 2A, and structural features such as thickness and width, and technical effect of each layer in the touch sensing layer 410 are also the same as those of the display device 100. Details are not described hereinafter.

The circuit shielding layer 444 is located on a surface 420S of the base layer 420 facing the touch sensing layer 410. The circuit shielding layer 444 is located in a non-display area NA (see FIG. 1). In this embodiment, the third insulating layer 415 directly contacts the base layer 420 and the circuit shielding layer 444, and the third insulating layer 415 is disposed to fill a gap between the circuit shielding layer 444 and the base layer 420. In some embodiments, the thickness of the third insulating layer 415 is in a range of about 5 microns to 20 microns. The base layer 420 and the cover plate structure 440 have no adhesive material therebetween, and the touch sensing layer 410 and the base layer 420 also have no adhesive material. Therefore, the touch sensing layer 410, the base layer 420 and the cover plate structure 440 can collectively form the first integrated module 400A. As such, the cover plate structure 440 and the touch sensing layer 410 do not need to be bonded by means of an adhesive layer, so that the overall thickness of the display device 400 can be reduced.

In this embodiment, the display device 400 further includes a light guide plate 450 and a water vapor barrier layer 480. The water vapor barrier layer 480 is located on the display panel 430, and the light guide plate 450 is located between the display panel 430 and the touch sensing layer 410. The light guide plate 450 and the touch sensing layer 410 are bonded through an adhesive layer 470, and the light guide plate 450 and the display panel 430 are also bonded through an adhesive layer 470.

Figure 7B:
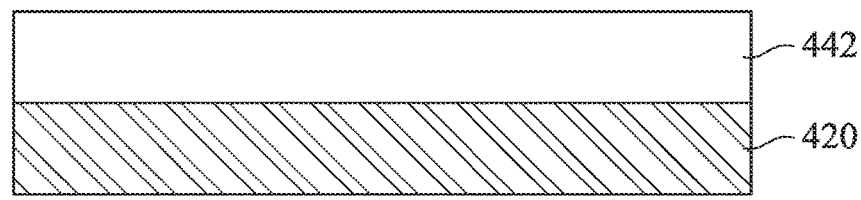
FIG. 7B to FIG. 7D are cross-sectional views of each steps of a fabrication method of the display device of FIG. 7A.
Figure 7C:
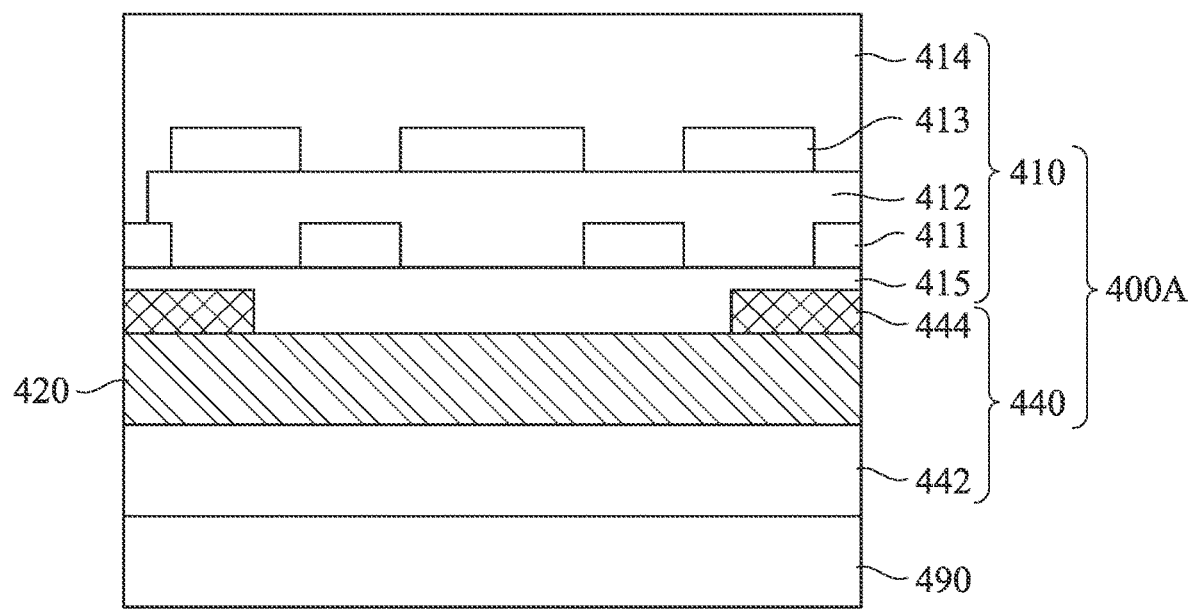
Figure 7D:
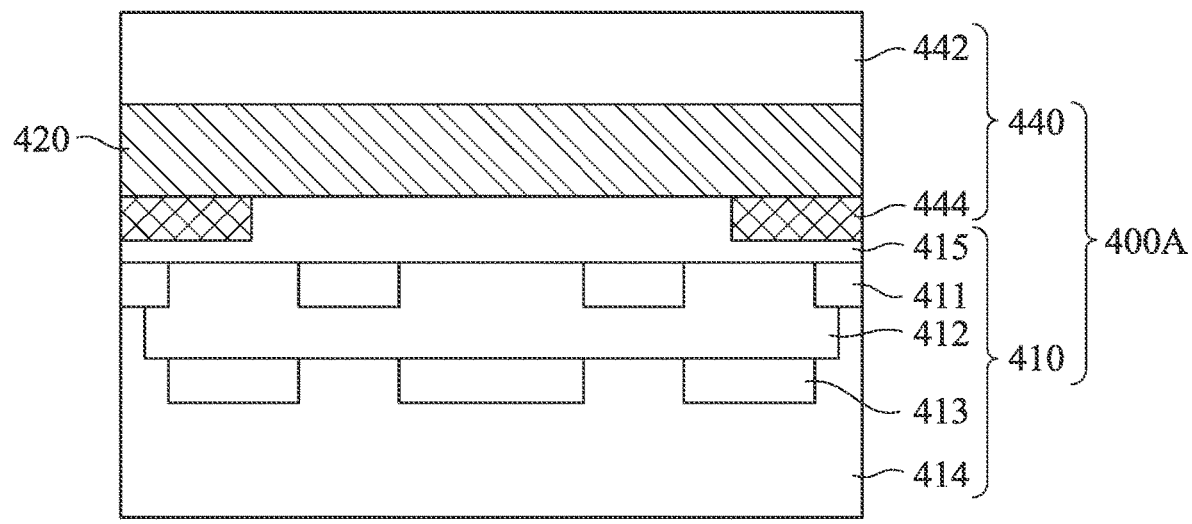
Figure 7D:
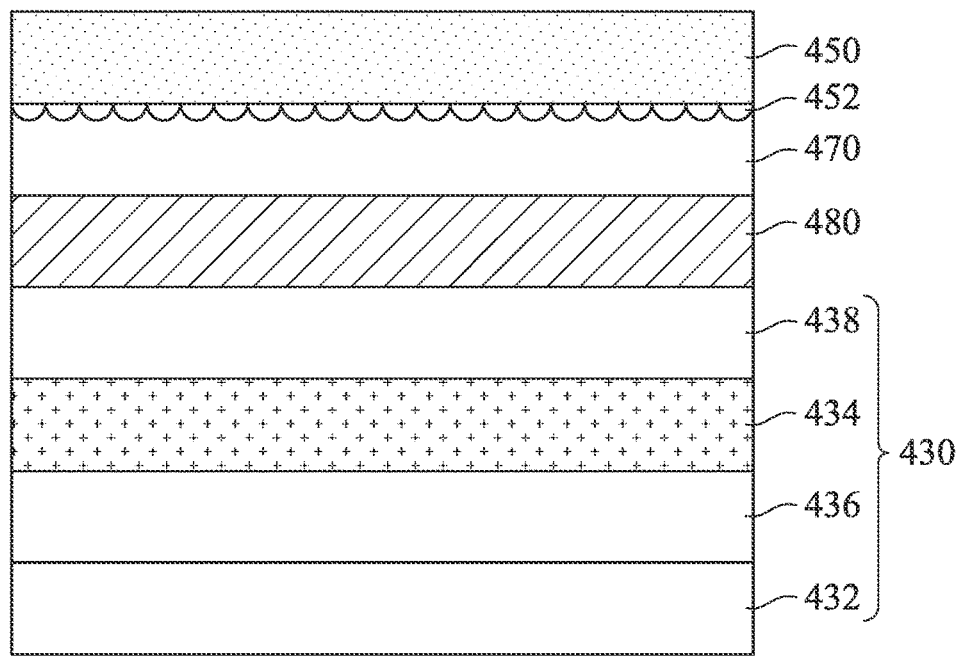

FIG. 7B to FIG. 7D are cross-sectional views of each steps of a fabrication method of the display device 400 of FIG. 7A. Reference is made to FIG. 7B, the cover plate structure 440 is first formed on the base layer 420.

Reference is made to FIG. 7C, the structure in FIG. 7B is then inverted and placed on a carrier plate 490, and then the circuit shielding layer 444 is formed on the base layer 420. Next, the touch sensing layer 410 is formed on the cover plate structure 440 and the base layer 420. Forming the touch sensing layer 410 includes forming the third insulating layer 415 on the circuit shielding layer 444 and the base layer 420, to fill a gap between the circuit shielding layer 444 and the base layer 420. Subsequently, as stated in FIG. 2B, the first sensing electrode 411, the first insulating layer 412, the second sensing electrode 413, and the second insulating layer 414 are formed in sequence. As such, the integrated module 400A can be obtained. In some embodiments, if a sheet-to-sheet process is adopted, the structure in FIG. 7B can be inverted and fixed on a glass substrate as the carrier plate 490 by means of a pyrolytic adhesive. In some embodiments, if a roll-to-roll process is adopted, the pyrolytic adhesive can be used as the carrier plate 490. Therefore, the fabrication of the display device 400 is not limited to process methods.

Reference is made to FIG. 7D, after the water vapor barrier layer 480 is formed on the display panel 430, the water vapor barrier layer 480 is bonded to the light guide plate 450 through an adhesive layer 470. Reference is made to FIG. 7D and FIG. 7A, the structure of FIG. 7D is then bonded to the first integrated module 400A through an adhesive layer 470. As such, the display device 400 can be obtained, so that the cover plate structure 440 and the touch sensing layer 410 are integrated.

In conclusion, according to the display device of the present disclosure, the touch sensing layer can be integrated into the display device or the cover plate structure by means of the base layer, to decrease the number of adhesive layers of the entire display device and reduce the overall thickness of the display device. As such, the display device can be made lighter and thinner, the bending properties of the display device can be improved, process steps of the display device can be reduced, and the complexity of the fabrication process can be simplified. Since the touch sensing layer can be directly formed on the base layer, the first sensing electrode and the second sensing electrode located in the display area and the non-display area can be separately formed in the same etching and development process. Besides, the nano metal particles of the first sensing electrode and the second sensing electrode of the touch sensing layer can reduce the limitation of materials on the bending degree, thereby improving the bendability of the touch sensing layer. The material of the light guide plate includes thermoplastic polyurethanes so that the light guide plate has better toughness, resilience and self-repairing properties. Such design can reduce the difference in surface properties and the difference in bendability from the adhesive layer. Therefore, the bending resistance of the entire display device can be improved, which is beneficial to the application in large-sized and flexible products.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
a base layer comprising a colorless polyimide (CPI) layer and a water vapor barrier layer;
a touch sensing layer disposed on the base layer and comprising a second insulating layer;
a light guide module disposed on the touch sensing layer, wherein the light guide module comprises a light guide plate and a cover structure, the light guide plate comprises a dot structure, and the light guide plate and the cover structure have no adhesive material therebetween, and a material of the light guide plate comprises thermoplastic polyurethanes (TPU);
a display panel, wherein the touch sensing layer is located between the light guide module and the display panel, and the touch sensing layer and the display panel have no adhesive material therebetween, the display panel comprises a substrate, an electronic ink layer, a lower electrode, and an upper electrode, the upper electrode contacts a surface of the water vapor barrier layer facing away from the colorless polyimide layer, and the upper electrode is located between the electronic ink layer and the water vapor barrier layer; and an adhesive layer disposed between the light guide module and the touch sensing layer, wherein the adhesive layer contacts and adheres the dot structure of the light guide plate and the second insulating layer of the touch sensing layer.

2. The display device of claim 1, wherein the touch sensing layer contacts the base layer.

3. The display device of claim 1, wherein the water vapor barrier layer and the touch sensing layer are respectively located on two opposite sides of the colorless polyimide layer.

4. The display device of claim 1, wherein the touch sensing layer further comprises a first sensing electrode, a first insulating layer, and a second sensing electrode, wherein the first sensing electrode is located between the base layer and the first insulating layer, and the second sensing electrode is located between the first insulating layer and the second insulating layer.

5. The display device of claim 4, wherein the first insulating layer contacts the base layer.

6. The display device of claim 4, wherein the touch sensing layer further comprises a third insulating layer, the third insulating layer is located between the base layer and the first sensing electrode, and the third insulating layer contacts the base layer.

7. The display device of claim 4, wherein materials of the first sensing electrode and the second sensing electrode are nano conductive materials.

8. The display device of claim 1, wherein the light guide module further comprises a circuit shielding layer.

9. The display device of claim 1, wherein the light guide plate comprises a hard coating layer and an anti-glare layer.

10. A fabrication method of a display device, comprising:
forming a touch sensing layer on a base layer so that the touch sensing layer directly contacts the base layer, wherein the base layer comprises a colorless polyimide layer and a water vapor barrier layer, and the touch sensing layer comprises a second insulating layer;
disposing a light guide module on one side of the touch sensing layer, comprising:
directly disposing a cover structure on a light guide plate, wherein a material of the light guide plate comprises thermoplastic polyurethanes;
forming a dot structure on a lower surface of the light guide plate; and
forming an adhesive layer between the light guide module and the touch sensing layer such that the adhesive layer contacts and adheres the dot structure of the light guide plate and the second insulating layer of the touch sensing layer; and
disposing a display panel on the other side of the touch sensing layer and the base layer, wherein the touch sensing layer and the display panel have no adhesive material therebetween, the display panel comprises a substrate, an electronic ink layer, a lower electrode, and an upper electrode, disposing the display panel further comprises:
forming the upper electrode on a surface of the water vapor barrier layer facing away from the colorless polyimide layer such that the upper electrode contacts the surface of the water vapor barrier layer, and the upper electrode is located between the electronic ink layer and the water vapor barrier layer.

11. The fabrication method of a display device of claim 10, wherein forming the touch sensing layer on the base layer comprises:
forming a first sensing electrode on the colorless polyimide layer;
forming a first insulating layer on the first sensing electrode;
forming a second sensing electrode on the first insulating layer; and
forming the second insulating layer on the second sensing electrode.

12. The fabrication method of a display device of claim 11, further comprising:
forming a third insulating layer between the base layer and the first sensing electrode so that the third insulating layer contacts the base layer.

13. The fabrication method of a display device of claim 11, wherein forming the touch sensing layer on the base layer comprises locating the colorless polyimide layer between the water vapor barrier layer and the touch sensing layer.

14. The fabrication method of a display device of claim 10, wherein forming the light guide module further comprises:
forming the light guide plate with thermoplastic polyurethanes (Thermoplastic polyurethanes, TPU);
forming a circuit shielding layer on an upper surface of the light guide plate;
forming a hard coating layer or an anti-glare layer on the upper surface of the light guide plate; and
forming the dot structure on a lower surface of the light guide plate.

15. A fabrication method of a display device, comprising:
providing a display panel, wherein the display panel comprises a substrate, an electronic ink layer, a lower electrode, and an upper electrode;
forming a base layer covering the upper electrode of the display panel, wherein the base layer comprises a colorless polyimide layer and a water vapor barrier layer;
wherein providing the display panel comprises:
forming the upper electrode on a surface of the water vapor barrier layer facing away from the colorless polyimide layer such that the upper electrode contacts the surface of the water vapor barrier layer, and the upper electrode is located between the electronic ink layer and the water vapor barrier layer;
forming a touch sensing layer on the base layer so that the touch sensing layer directly contacts the base layer; and
disposing a light guide module on the other side of the touch sensing layer opposite to the display panel, comprising:
directly disposing a cover structure on a light guide plate, wherein a material of the light guide plate comprises thermoplastic polyurethanes; and
forming a dot structure on a lower surface of the light guide plate;
wherein forming the touch sensing layer comprises: forming a first sensing electrode, a first insulating layer, a second sensing electrode, and a second insulating layer in sequence; and
forming an adhesive layer between the light guide module and the touch sensing layer such that the adhesive layer contacts and adheres the dot structure of the light guide plate and the second insulating layer of the touch sensing layer.

16. A fabrication method of a light guide touch module, comprising:
- forming a light guide module, comprising:
  - providing a light guide plate;
  - directly disposing a cover structure on the light guide plate, wherein a material of the light guide plate comprises thermoplastic polyurethanes;
  - forming a circuit shielding layer on an upper surface of the light guide plate;
  - forming a hard coating layer or an anti-glare layer on the upper surface of the light guide plate; and
  - forming a dot structure on a lower surface of the light guide plate;
- forming a touch sensing layer, comprising:
  - providing a base layer, wherein the base layer comprises a colorless polyimide layer and a water vapor barrier layer;
  - forming a first sensing electrode on the base layer;
  - forming a first insulating layer on the first sensing electrode;
  - forming a second sensing electrode on the first insulating layer; and
  - forming a second insulating layer on the second sensing electrode;
- attaching the dot structure in the light guide module to the second insulating layer by means of an adhesive layer such that the adhesive layer contacts the dot structure and the second insulating layer; and
- disposing a display panel on a surface of the water vapor barrier layer facing away from the colorless polyimide layer such that an upper electrode of the display panel contacts the surface of the water vapor barrier layer, and the upper electrode is located between an electronic ink layer of the display panel and the water vapor barrier layer.

* * * * *